United States Patent
Yin et al.

(10) Patent No.: US 10,491,693 B2
(45) Date of Patent: Nov. 26, 2019

(54) METHOD AND APPARATUS FOR DEPLOYING EDGE SERVERS

(71) Applicant: Tsinghua University, Beijing (CN)

(72) Inventors: Hao Yin, Beijing (CN); Xu Zhang, Beijing (CN); Hongqiang Liu, Beijing (CN)

(73) Assignee: Tsinghua University, Beijing (CN)

( * ) Notice: Subject to any disclaimer, the term of this patent is extended or adjusted under 35 U.S.C. 154(b) by 424 days.

(21) Appl. No.: 15/027,358

(22) PCT Filed: Aug. 25, 2015

(86) PCT No.: PCT/CN2015/087999
§ 371 (c)(1),
(2) Date: Apr. 5, 2016

(87) PCT Pub. No.: WO2016/192214
PCT Pub. Date: Dec. 8, 2016

(65) Prior Publication Data
US 2017/0163745 A1   Jun. 8, 2017

(30) Foreign Application Priority Data

Jun. 2, 2015 (CN) .......................... 2015 1 0295684

(51) Int. Cl.
*G06F 15/177* (2006.01)
*H04L 29/08* (2006.01)
(Continued)

(52) U.S. Cl.
CPC .......... *H04L 67/18* (2013.01); *H04L 41/0806* (2013.01); *H04L 41/12* (2013.01);
(Continued)

(58) Field of Classification Search
CPC .. H04L 67/18; H04L 41/0806; H04L 61/2007
(Continued)

(56) References Cited

U.S. PATENT DOCUMENTS 6,928,485 B1 * 8/2005 Krishnamurthy ............................ G06F 17/30598
709/220
7,366,108 B2   4/2008 Szentesi et al.
(Continued)

FOREIGN PATENT DOCUMENTS

CN    101374249 A    2/2009
CN    103428220 A    12/2013
(Continued)

OTHER PUBLICATIONS

S. Eugene Ng and Hui Zhang. 2001. Towards global network positioning. In Proceedings of the 1st ACM SIGCOMM Workshop on Internet measurement (IMW '01). ACM, New York, NY, USA, 25-29.*
(Continued)

*Primary Examiner* — Taylor A Elfervig
(74) *Attorney, Agent, or Firm* — Merchant & Gould P.C.

(57) ABSTRACT

A method and apparatus for deploying edge servers are provided. The method includes: obtaining IP addresses of target users for the edge server to be deployed; mapping the IP addresses of the target users into a virtual geometric space; clustering the target users based on coordinates of the target users in the virtual geometric space, to obtain a plurality of user groups; and determining locations of the edge servers corresponding to the plurality of user groups based on the coordinates of the target users in the plurality of user groups.

16 Claims, 1 Drawing Sheet

(51) Int. Cl.
  *H04L 12/24* (2006.01)
  *H04L 29/12* (2006.01)
(52) U.S. Cl.
  CPC .......... *H04L 61/2007* (2013.01); *H04L 67/04* (2013.01); *H04L 61/609* (2013.01)
(58) Field of Classification Search
  USPC ........................................................ 709/222
  See application file for complete search history.

(56) References Cited

U.S. PATENT DOCUMENTS

| | | | | |
|---|---|---|---|---|
| 7,788,400 | B2* | 8/2010 | Tang | H04L 45/12 709/238 |
| 9,026,145 | B1* | 5/2015 | Duleba | H04L 61/25 455/456.3 |
| 2004/0059830 | A1* | 3/2004 | Brown | H04L 41/0893 709/238 |
| 2004/0249939 | A1* | 12/2004 | Amini | H04L 29/06 709/225 |
| 2005/0084265 | A1* | 4/2005 | Dotaro | H04J 14/0227 398/49 |
| 2006/0087986 | A1* | 4/2006 | Dube | H04L 41/12 370/255 |
| 2007/0050497 | A1* | 3/2007 | Haley | H04L 43/0817 709/224 |
| 2007/0097951 | A1* | 5/2007 | Hilt | H04L 45/02 370/351 |
| 2008/0180446 | A1 | 7/2008 | Gallivan | |
| 2009/0089438 | A1* | 4/2009 | Agarwal | H04L 29/12066 709/228 |
| 2009/0265473 | A1* | 10/2009 | Hydrie | H04L 67/104 709/229 |
| 2012/0239734 | A1* | 9/2012 | Dominick | G06F 9/505 709/203 |
| 2013/0339100 | A1* | 12/2013 | Warrick | G06Q 10/0637 705/7.36 |

FOREIGN PATENT DOCUMENTS

| | | |
|---|---|---|
| CN | 103516547 A | 1/2014 |
| CN | 104935462 A | 9/2015 |
| WO | 2011/006375 A1 | 1/2011 |
| WO | 2014/080304 A2 | 5/2014 |

OTHER PUBLICATIONS

A. Agrawal and H. Casanova, "Clustering hosts in P2P and global computing platforms," CCGrid 2003. 3rd IEEE/ACM International Symposium on Cluster Computing and the Grid, 2003. Proceedings., Tokyo, Japan, 2003, pp. 367-373. (Year: 2003).*
Lili Qiu, V. N. Padmanabhan and G. M. Voelker, "On the placement of Web server replicas," Proceedings IEEE INFOCOM 2001. Conference on Computer Communications. 20th Annual Joint Conference of the IEEE Computer and Communications Society, Anchorage, AK, USA, 2001, pp. 1587-1596 vol. 3. (Year: 2001).*
A. Karve, T. Kimbrel, G. Pacifici, M. Spreitzer, M. Steinder, M. Sviridenko, and A. Tantawi. 2006. Dynamic placement for clustered web applications. In Proceedings of the 15th international conference on World Wide Web (WWW '06). ACM, New York, NY, USA, 595-604. DOI: (Year: 2006).*
International Search Report and Written Opinion for International Application No. PCT/CN2015/087999, dated Feb. 19, 2016, 12 pages.
Chinese Office Action from corresponding Chinese Patent Application No. 201510295684.7, dated Oct. 10, 2017.

* cited by examiner

METHOD AND APPARATUS FOR DEPLOYING EDGE SERVERS

CROSS-REFERENCE TO RELATED APPLICATIONS

This application is the National Stage of International Application No. PCT/CN2015/087999, titled "METHOD AND APPARATUS FOR DEPLOYING EDGE SERVER", and filed on Aug. 25, 2015, which claims priority to Chinese Patent Application No. 201510295684.7 titled "METHOD AND APPARATUS FOR DEPLOYING EDGE SERVERS" and filed with the State Intellectual Property Office of People's Republic of China on Jun. 2, 2015, both of which are incorporated herein by reference in their entireties.

FIELD

The present disclosure relates to the field of internet technology, and particularly to a method and an apparatus for deploying edge servers.

BACKGROUND

Currently, with the development of the internet, more and more users have higher and higher demand for the quality of network service. Many network services (such as search engine, online video service, social network and edge computing service) require edge servers widely distributed in various geographic and network areas to guarantee the quality of service. High quality of network service requires small enough network delay from a server to the users it serves, and in view of this, a network service provider has to deploy enough edge servers in places near the users.

During the research process, the inventor finds out that conventional methods for deploying edge servers have the following disadvantages: edge servers are deployed only at a given candidate server site, and the deploy is optimized only for one single objective, for example, only the smallest number of servers is taken into consideration.

SUMMARY

In conventional technology, if an edge server is deployed only at given a candidate server site, it fails to discover an unknown and better edge server site, which causes the network provider to miss a lot of opportunities of improving network delay, saving cost and improving user performance. Besides, the deploy is optimized only for one single objective in conventional methods, instead of taking into consideration all kinds of practical factors and providing a tradeoff curve for the network service provider to decide based on its current situations (such as an upper limit of the cost and a user performance requirement) at discretion where to deploy the edge servers.

In view of this, the disclosure is to solve one or more of the problems mentioned above. A method for deploying edge servers is provided according to some embodiments of the disclosure, to avoid problems caused by deploying the edge servers only at a given candidate server site and deploying the edge servers only taking into consideration one single objective, thus the quality of the service provided for users by the edge servers is enhanced, the user performance is improved and the cost of deploying the edge servers is saved.

An apparatus for deploying edge servers is further provided according to the disclosure, to guarantee the practical implementation and application of the method mentioned above.

To solve the problems mentioned above, a method for deploying edge servers is provided according to an embodiment of the disclosure. The method includes:

obtaining IP addresses of target users for the edge servers to be deployed;

mapping the IP addresses of the target users into a virtual geometric space;

clustering the target users based on coordinates of the target users in the virtual geometric space, to obtain a plurality of user groups; and determining locations of the edge servers corresponding to the plurality of user groups based on the coordinates of the target users in the plurality of user groups.

An apparatus for deploying edge servers is further provided according to an embodiment of the disclosure. The apparatus includes:

an obtaining module, configured to obtain IP addresses of target users for the edge servers to be deployed;

a mapping module, configured to map the IP addresses of the target users into a virtual geometric space;

a clustering module, configured to cluster the target users based on coordinates of the target users in the virtual geometric space, to obtain a plurality of user groups; and a location determining module, configured to determine locations of the edge servers corresponding to the plurality of user groups based on the coordinates of the target users in the plurality of user groups.

An apparatus for deploying edge servers is further provided according to an embodiment of the disclosure. The apparatus includes a storage and a processor.

The storage stores program commands, which allow the apparatus to perform the following operations when the program commands are executed by the processor:

obtaining IP addresses of target users for the edge servers to be deployed;

mapping the IP addresses of the target users into a virtual geometric space respectively;

clustering the target users based on coordinates of the target users in the virtual geometric space, to obtain a plurality of user groups; and determining locations of the edge servers corresponding to the plurality of user groups based on the coordinates of the target users in the plurality of user groups.

A computer readable storage medium is further provided according to an embodiment of the disclosure. The storage medium includes program commands which allow the processor to perform the method according to the disclosure when the program commands are executed by the processor.

Compared with conventional technology, the embodiments of the disclosure have the following advantages.

In the embodiments of the disclosure, the IP addresses of target users of respective edge servers to be deployed are mapped into the virtual geometric space at first, then the users are clustered based on the user coordinates in the geometric space, and the locations of edge servers corresponding to the respective user groups are determined based on user coordinates after clustering. It can be seen that characteristics of geographic locations of respective users are taken into consideration in the embodiments of the disclosure, i.e., the locations of edge servers are determined based on geographic and/or network locations of the users in a network service, thus edge servers with an unknown and better deployment location may be discovered, and the performance of deploying edge servers is better.

Of course, any product implementing the disclosure does not necessarily require all the advantages described above.

BRIEF DESCRIPTION OF THE DRAWINGS

To illustrate the technical solutions according to the embodiments of the disclosure more clearly, the drawings to be used in the description of the embodiments are described briefly hereinafter. Apparently, the drawings in the following description are only some embodiments of the disclosure. For those skilled in the art, other drawings may be obtained based on these drawings without any creative effort.

DETAILED DESCRIPTION

Technical solutions according to the embodiments of the disclosure are described clearly and completely hereinafter in conjunction with the drawings. Apparently, the described embodiments are only some rather than all of the embodiments of the disclosure. Any other embodiment obtained by those skilled in the art based on the embodiments in the disclosure without any creative work fall in the protection scope of the disclosure.

The application may be applied to various environment or configuration of general-purpose or special-purpose computing devices, such as a personal computer, a server computer, a handheld or portable device, a tablet device, a multiprocessor device or distributed computing environment including any apparatus or device mentioned above.

The application may be described in general context of computer executable instructions executed by a computer, such as a program module. Generally, the program module includes a routine, a program, an object, a component, data structure, etc., which perform a specific task or implement a specific abstract data type. The application may also be implemented in the distributed computing environment where the task is performed by a remote processing device connected through a communications network. In the distributed computing environment, the program module may be located in a local or remote computer storage medium, such as a storage device.

A method for positioning an edge server, i.e., a method for deploying edge servers, is provided according to an embodiment of the disclosure. First, appropriate or even optimal locations of the edge server are deduced reversely from distribution of geographic or network locations of a user. Then, based on the calculated and ideal locations of the edge server, a network service provider searches for an unknown location allowable for deploying the edge server and a method thereof. The method for deploying may include renting a third-party server, deploying a server room by the network service provider and connecting to a data center through optical fiber in a private network; or, the method for deploying may include network function virtualization (NFV), etc. After that, the network service provider may obtain a set of candidate nodes for deploying the edge server, which includes a known edge server and an unknown edge server discovered in the process of reverse deduction based on the distribution of the user.

Figure 1:
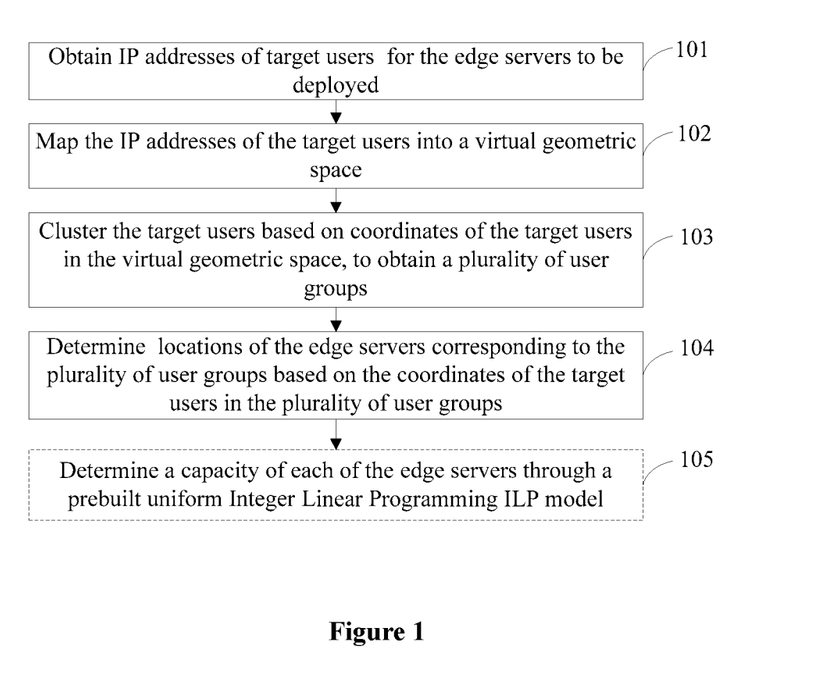
FIG. 1 is a flowchart of a method for deploying an edges server according to an embodiment of the disclosure.

The method for deploying the edge server according to the embodiment of the disclosure is described in conjunction with FIG. 1. FIG. 1 shows a flowchart of the method for deploying the edge server according to the embodiment of the disclosure. The method includes steps 101-104.

Step 101 may include obtaining IP addresses of target users of an edge server to be deployed.

In this step, to deduce the appropriate location for deploying the edge server reversely from location information of the user, a network distance between each user and each edge server is required. However, information such as network distance can not be obtained completely, for it is difficult to control millions of or more users to be proactive in network delay measurement along with the edge server in practice, and the user cannot measure the network distance from an unknown edge server before deployment and discovery of the edge server. In view of this, IP addresses of target users of the edge server to be deployed are acquired at first in step 101, and then the IP addresses of respective users are mapped into virtual geometric space in step 102 described hereinafter. Each network node (including the user and the edge server) is a point having specific coordinates in the geometric space, and the network distance between arbitrary two network nodes may be calculated based on corresponding coordinates in the virtual geometric space.

The target users may be determined through analyzing user access logs, or through designating areas to be served and randomly sampling in respective areas.

Step 102 may include mapping the IP addresses of the target users into the virtual geometric space.

In step 102, the IP addresses of the target users obtained in step 101 are mapped into virtual geometric space S. The virtual geometric space S may be geographic location space or network space frequently used in network technology. A geographic location coordinate and a network coordinate are adopted in these two kinds of virtual geometric space respectively, where the geographic location coordinate may be a geographical coordinate.

In a case that the virtual geometric space is the geographic location space, i.e., the virtual coordinate in the virtual geometric space is the geometric location coordinate, step 102 may include steps A1-A2.

Step A1 may include searching in a geographic location database for geographic location information corresponding to the IP addresses of the respective target users, where the geographic location database stores a correspondence relationship between the IP addresses and the geographic location information.

For example, the geographic location database may be maintained, where the geographic location database stores the correspondence relationship (mapping relationship) between the IP addresses and the geographic location information. The correspondence relationship may be obtained from the geographic location database for the IP addresses. After the IP addresses of the respective target users are obtained, corresponding geographic location information may be found directly in the geographic location database. For example, the IP address of the user is 202.112.14.128, and the geographic information mapped out may include an area corresponding to the IP address, such as Beijing, or a geographical coordinate corresponding to the IP address, such as (56.8, 23.9).

Step A2 may include determining coordinates of the target users in the virtual geometric space according to the geographic location information.

In this step, the geographic location information found in step A1 is directly determined as the coordinates of the target users in the virtual geometric space.

In a case that the virtual geometric space is the network space, i.e., the virtual coordinate in the virtual geometric space is the network virtual coordinate, step 102 may include steps B1-B2.

Step B1 may include mapping the IP addresses of the target users to virtual network coordinates respectively through a network space construction algorithm GNP.

For example, the IP addresses are mapped to the virtual network coordinates through a specific network space construction algorithm GNP. A specific mapping process is as follows. Supposing there are N users (i.e., marked nodes) between which network delays are known, where N is an integer larger than zero. Coordinates of the N marked nodes in the network space are calculated based on measurement results of the network delays between the N marked nodes; then network delay measurement is performed on respective nodes to be measured (i.e., the target users) based on the N marked nodes, and network coordinates of the respective nodes to be measured are calculated based on results of the measurement and the known network coordinates of the N marked nodes.

Step B2 may include determining the virtual network coordinates as coordinates of the target users in the virtual geometric space.

In this step, the virtual network coordinates obtained through mapping in step B1 as the coordinates of the target users in the network space.

After the user coordinates in the virtual geometric space are obtained, step 103 is performed. Step 103 may include clustering the target users based on the coordinates of the target users in the virtual geometric space, to obtain a plurality of user groups.

In this step, the target users are clustered based on the coordinates of the target users in the virtual geometric space, i.e., based on relative distance between the target users, to obtain the plurality of user groups. After user clustering, each target user is classified into a user group. Since the users in one user group are close enough to each other, it is convenient to find one or more edge server locations which are close enough to the respective users in a specific user group.

In step 103, the target users may be clustered based on a consistency of a network distance with an actual distance and based on a principle of farthest user priority, where the network distance is a distance in the virtual geometric space between the target users, to obtain the plurality of user groups.

It should be noted that, in the embodiment, the virtual geometric space S is an approximate estimation of actual network space, and errors occur when the actual distance or locations of the nodes are estimated directly through the virtual coordinates in the geometric space S. In the embodiment, the user clustering is performed based on relative values of the network distance provided in the geometric space S, rather than directly based on absolute values of the network distance provided in the geometric space S. Thus, in practical applications, a standard for determining merits of the geometric space S is not accuracy of the absolute values of the actual distance estimated in the geometric space S, but the consistency of the geometric space S. It may be understood that, the network distance between the users may be represented by the network delay between the users. For example, a user A sends a data package to a user B, and a time lag between the moment the user B receives the data package and the moment the user A sends the data package is the network delay, i.e., the network distance between the user A and the user B.

The consistency of the network distance with the actual distance may be defined as: if the network distance between arbitrary two target users is larger than the network distance between another two target users, the actual distance between the arbitrary two target users is also larger than the actual distance between another two target users. For example, if the network distance between target users A and B is larger than the network distance between target users C and D, the actual distance between target users A and B is also larger than the actual distance between target users C and D, or if the network distance between target users E and F is less than the network distance between target users G and H, the actual distance between target users E and F is also less than the actual distance between target users G and H, which is called the consistency of the network distance with the actual distance. It can be seen that, the consistency of the geometric space S is the precondition for the consistency of the respective network nodes, and the better the consistency of the virtual network space S is, the better the performance of user clustering is.

The principle of farthest user priority may be defined as: in any user group, a maximum network distance between two target users is less than a preset clustering distance threshold, i.e., the distance between any two target users in the user group is not larger than a preset clustering distance threshold Dmax.

Specifically, the user clustering in step 103 may be exemplified as follows. Supposing there are four users A, B, C and D, the distance between them are d[A,B]=d[A,C]=d[B,C]=2, d[A,D]=10, d[B,D]=12 and d[C,D]=12 respectively, and Dmax=5. First, one user may be chosen randomly, such as user A. And the user D farthest from the user A is found. Since d[A,D]>Dmax, the user D may be put into a new cluster separately, and since the distance from users B and C to the user A are both less than Dmax, users B, C and A are classified into one cluster. A final clustering result is as: {A, B, C} is one cluster, and {D} is another cluster, i.e., two user groups are obtained.

Step 104 is then performed. Step 104 may include determining locations of respective edge servers corresponding to the plurality of user groups based on the coordinates of the respective target users in the plurality of user groups.

After the plurality of user groups are obtained, the locations of the respective edge servers corresponding to the plurality of user groups are determined based on the coordinates of the respective target users in the plurality of user groups.

Supposing the geometric space S is geographic location space, this step may include steps C1-C2.

Step C1 may include obtaining geographic location information of the target users in the plurality of user groups in the virtual geometric space.

For the plurality of user groups, the geographic location information of the target users in the plurality of user groups in the geometric space S is obtained first. For example, the geographic location information of the user A is Beijing, and the geographic location information of the user B is Baoding.

Step C2 may include determining the locations of respective edge servers corresponding to the plurality of user groups based on the geographic location information of the target users.

The locations of respective edge servers corresponding to the plurality of user groups are determined based on the geographic location information of the target users. The location with a maximum number of occurrences may be determined as the location of the edge server corresponding to the user group, and if multiple locations have the same number of occurrences, the multiple locations are determined as locations of the edge server corresponding to the user group. For example, supposing there are ten target users in one user group, where five target users are in Beijing, three target users are in Tianjin and two target users are in Baoding, the corresponding location of edge server is Beijing. Another example, supposing there are five target users in one user group, where the geographic location information of two target users is Tianjin, the geographic location information of another two target users is Baoding and the geographic location information of the other one target user is Beijing, it may be determined that the user group corresponds to two locations of the edge server, which are Tianjin and Baoding respectively.

Supposing the geometric space S is network space, this step may include steps D1-D4.

Step D1 may include determining central users in the plurality of user groups and a set of neighbor users corresponding to respective central users, where the set of neighbor users includes one or more users from which network distance to the central users is less than a preset distance threshold.

After user clustering, the central users in each user group are found in this step. In one embodiment, the central user is a user from which maximum distance to other users is the shortest in the user group, while in another embodiment, the central user is a user from which an average distance to other users is the shortest in the user group. After the central user is found, N (N is an integer larger than zero and a specific value may be set by those skilled in the art) users closest to the central user are chosen from the user group, to form a set of neighbor users corresponding to each central user. The set of neighbor users may include one or more users from which the network distance to the central user is less than the preset distance threshold, where the preset distance threshold may be set by those skilled in the art themselves.

Step D2 may include determining geographic locations of the neighbor users in respective sets of neighbor users.

The network coordinates of the respective neighbor users are reversely mapped into actual geographic space, to obtain the geographic locations of the neighbor users in the respective sets of neighbor users. For example, it is determined which cities the respective neighbor users are in, or the geographic locations may be represented through geographical information.

Step D3 may include determining the geographic location which occurs the most frequently in each set of neighbor users as the geographic location of the corresponding central user.

In this step, for each set of neighbor users, the geographic location with the maximum number of occurrences is determined as the geographic location of the central user corresponding to the set of neighbor users. For example, in one set of neighbor users, Beijing occurs the most frequently, thus Beijing is determined as the geographic location of the central user corresponding to the set of neighbor users. If multiple cities have the same number of occurrences, the multiple cities are determined as the geographic locations of the central user.

Step D4 may include determining whether the geographic locations of the respective central users are suitable for deploying edge servers based on a preset deploy determination principle. In case of positive determination, the geographic locations suitable for deploying edge servers are determined as candidate locations for the edge servers of a corresponding user group respectively.

After geographic location of a central node is found, possibilities of deploying edge servers at the geographic location are sought in sequence. For example, based on the preset deploy determination principle, it is determined whether the geographic locations of the respective central users are suitable for deploying edge servers, and in case of positive determination, the geographic locations suitable for deploying edge servers are determined as candidate locations for the edge servers of a corresponding user group respectively, and finally each user group will have a set of locations of corresponding candidate edge servers. It is understood that, a set of edge servers of one user group includes all edge servers which are close enough to the users in the user group, newfound and known previously. When determining whether a specific geographic location is suitable for deploying the edge server, it may be determined whether there are a third-party server room and a cloud computing server at the geographic location, and whether local policies and a condition of network optical fibers permit. A specific determination principle may be set by those skilled in the art as needed.

It is understood that, after the location of the edge server is determined, a capacity of each edge server may be planned, and after step 104, the method may further include step 105.

Step 105 may include determining the capacity of each edge server through a prebuilt uniform integer linear programming ILP model.

In this embodiment, capacity planning for the edge server mainly determines a user group which each edge server node serves. Synthesizing modeling is performed based on user demands for edge server resources, the relative locations between the edge server and the users, and bearing capacity of an edge server node, and the capacity of the edge server is finally obtained through integer linear programming.

In practical applications, the respective edge server nodes have actual capacity limits and different prices, and some edge servers serve some specific users due to legal or policy restrictions in some districts. Therefore, after sets of candidate edge server nodes corresponding to the plurality of user groups are determined, the network service provider needs to find a solution for capacity planning of the edge servers, in order to determine how to use each edge server node, which includes the capacity of each edge server node (i.e., the number of users it can serve). An objective of the planning is to enable the edge server node to serve more users and to reduce the cost of edge server resources.

In this embodiment, the modeling process of the integer linear programming model is shown in Table 1.

TABLE 1

| inputs | |
|---|---|
| $G = \{g\}$ | set of user groups |
| $N_g$ | number of the users in user group g |
| $S_g$ | respective user nodes in user group g |
| $M_s$ | maximum capacity of edge server node s |
| $p_s$ | price per unit of resource for edge server node s |
| $c_s$ | one-time cost for opening edge server node s |
| Outputs | |
| $n_{g,s}$ | number of users that edge server node s services |
| $r_{g,s}$ | total capacity used by user group g on edge server node s |

| | |
|---|---|
| $y_s$ | 1 represents that the edge server node is closed and 0 represents that the edge server node is open |

Specifically, in the process of modeling, respective users corresponding to a same set of candidate edge servers are classified into one user group, Sg is used to represent the user group, and Ng is used to represent the number of users in the user group g. It is required to calculate the number of users in each user group served by the edge server node s in the process of modeling finally.

First, the total number of users served by the respective edge servers is no larger than the total number of users in one user group, which may be expresses by the following formula (1):

$$\forall g \in G: \Sigma_s n_{g,s} \leq N_g \quad (1)$$

Then, $r_{g,s}$, is used to represent the total capacity used by the user group g on the edge server node s, which is larger than the actual number of users in the user group g served by the edge server node s, and is expressed by the following formula (2):

$$\forall g \in G: r_{g,s} \geq n_{g,s} \quad (2)$$

The maximum number of concurrent users that the edge server node s can bear is expressed by the following formula (3):

$$\forall s: \Sigma_g r_{g,s} \leq M_s \quad (3)$$

$y_s$ is used to represent whether the edge server node s is serving, 1 means s is serving, and 0 means s is not serving, which is expressed by the following formulas (4) and (5):

$$\forall s: \frac{\sum_g r_{g,s}}{N} \leq y_s \leq \sum_g r_{g,s} \quad y_s \in \{0, 1\} \quad (4)$$

$$\forall s: y_s \in \{0, 1\} \quad (5)$$

For the edge server node, the total deploy cost is a sum of one-time cost for using the edge server and cost for using the resources, which is expressed by the following formula (6):

$$\Sigma_s(p_s \Sigma_g r_{g,s} + c_s y_s) \quad (6)$$

where $p_s$ represents the resource price of service node s and $c_s$ represents the starting price for using the service node s.

At last, the objective of edge server deployment is to maximize the number of users it can serve and to minimize the deploy cost, which is expressed by the following formula (7):

$$\max \Sigma_{g,s} n_{g,s} - \eta \Sigma_s(p_s \Sigma_g r_{g,s} + c_s y_s) \quad (7)$$

where η is larger than zero and may be a constant, to weigh the relation between the number of the users and the deploy cost.

After solutions to formulas (1) to (7) are obtained through calculation, a value of $\Sigma_g r_{g,s}$ is the capacity of the edge server node s, i.e., the number of users which the edge server node s can serve.

It can be seen that, in the embodiments of the disclosure, the IP addresses of target users of the respective edge servers to be deployed are mapped into the virtual geometric space first, then user clustering is performed based on the user coordinates in the geometric space, and the locations of edge servers corresponding to the plurality of user groups are determined based on the user coordinates after clustering. It can be seen that characteristics of geographic locations of respective users are taken into consideration in the embodiments of the disclosure, i.e., the locations of edge servers are determined based on geographic and network locations of the users in a network service, thus an edge server with an unknown and better deployment location may be discovered, and the performance of deploying the edge server is better. Furthermore, cost of deploying the edge server and performance requirements of the user are taken into consideration to deploy the edge server, thus low cost and user performances are achieved.

The foregoing method embodiments are described as combinations of a series of actions for convenience. Those skilled in the art should know that the present application is not limited by the described sequences of the actions, for some steps may be performed in other sequences or simultaneously according to the present application. Besides, those skilled in the art should also know that the embodiments described in the specification are all preferred embodiments, and the actions and modules involved are not necessarily required by the application.

Figure 2:
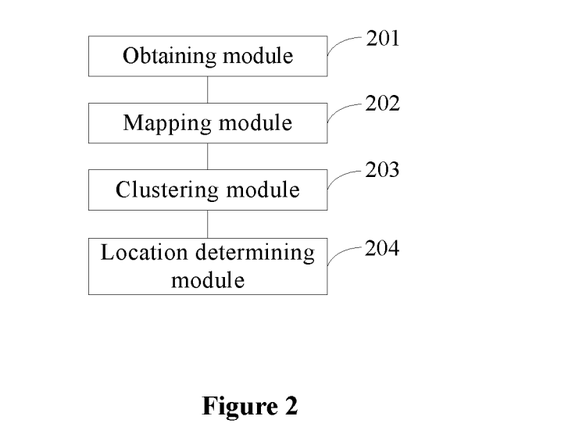
FIG. 2 is a structure diagram of an apparatus for deploying edge servers according to an embodiment of the disclosure.

Referring to FIG. 2, an apparatus for deploying edge servers corresponding to the method for deploying the edge server is further provided according to an embodiment of the disclosure. In this embodiment, the apparatus may include an obtaining module 201, a mapping module 202, a clustering module 203 and a location determining module 204.

The obtaining module 201 is configured to obtain IP addresses of target users of the edge server to be deployed.

The mapping module 202 is configured to map the IP addresses of the target users into virtual geometric space.

In a case that the geometric space is geographic location space, the mapping module 202 may include:

a searching sub-module, configured to search in a geographic location database for geographic location information corresponding to the IP addresses of respective target users, where the geographic location database stores a correspondence relationship between the IP addresses and the geographic information; and a first determining sub-module, configured to determine the geographic location information as coordinates of the target users in the virtual geometric space.

The virtual geometric space may be network space, and the mapping module 202 may include:

a mapping sub-module, configured to map the IP addresses of the target users to virtual network coordinates through a network space construction algorithm GNP; and a third determining sub-module, configured to determine the virtual network coordinates as the coordinates of the target users in the virtual geometric space.

The clustering module 203 is configured to cluster the target users based on the coordinates of the target users in the virtual geometric space, to obtain a plurality of user groups.

Specifically, the clustering module 203 is configured to cluster the target users based on consistency of the network distance with the actual distance and based on a principle of farthest user priority, where the network distance is a distance in the virtual geometric space between the target users, to obtain a plurality of user groups. The consistency of the network distance with the actual distance may be defined as: if the network distance between arbitrary two target users is larger than the network distance between another two target users, the actual distance between the arbitrary two target users is larger than the actual distance between the another two target users. The principle of farthest user priority is defined as: in any user group, a maximum network distance between two target users is less than a preset distance threshold.

The location determining module 204 is configured to determine locations of the edge servers corresponding to the plurality of user groups based on the coordinates of the target users in the plurality of user groups.

The location determining module may include:

an obtaining sub-module, configured to obtain the geographic location information of the target users in the plurality of user groups in the virtual geometric space; and a second determining sub-module, configured to determine locations of the edge servers corresponding to the plurality of user groups based on the geographic location information of the target users.

The location determining module 204 may further include:

a fourth determining sub-module, configured to determine respective central users in the plurality of user groups and respective sets of neighbor users corresponding to the respective central users, where the set of neighbor users include one or more users from which the network distance to the central users is smaller than a preset distance threshold;

a fifth determining sub-module, configured to determine geographic locations of the neighbor users in the respective sets of neighbor users;

a sixth determining sub-module, configured to determine a geographic location with a maximum number of occurrences in each set of neighbor users as the geographic location of the corresponding central user;

a judging sub-module, configured to judge whether the geographic location of each central user is suitable for deploying the edge server based on a preset deploy determination principle; and a seventh determining sub-module, configured to determine the geographic location suitable for deploying the edge server as a candidate location for the edge server of a corresponding user group in a case that the judging sub-module judges that the geographic location of each central user is suitable for deploying the edge server.

The apparatus may further include a capacity determining module, configured to determine a capacity of each edge server through a prebuilt uniform integer linear programming ILP model.

In the embodiment of the disclosure, the IP addresses of target users of the respective edge servers to be deployed are mapped into the virtual geometric space first, then user clustering is performed based on the user coordinates in the geometric space, and the locations of edge servers corresponding to the respective user groups are determined based on the user coordinates after clustering. It can be seen that characteristics of geographic locations of respective users are taken into consideration in the embodiment of the disclosure, i.e., the locations of edge servers are determined based on geographic and network locations of the users in a network service, thus an edge server with an unknown and better deployment location may be discovered, and the performance of deploying the edge server is better. Furthermore, cost of deploying the edge server and performance requirements of the user are taken into consideration to deploy the edge server, thus low cost and user performances are achieved.

It should be noted that, the embodiments of the disclosure are described in a progressive manner, where the differences between each embodiment and the other embodiments are emphasized and the similar parts in the embodiments can be cross-referenced. The apparatus embodiments are described briefly for they are similar to the method embodiments, and reference can be made to the description of method embodiments for related aspects.

It should be further noted that, relational terms in the disclosure such as the first or the second are only used to differentiate one entity or operation from another entity or operation rather than require or indicate the actual existence of the relation or sequence among the entities or operations. Terms such as "include", "comprise" or any other variants are meant to cover non-exclusive enclosure, so that the process, method, item or device comprising a series of elements not only include the elements but also include other elements which are not listed specifically or the inherent elements of the process, method, item and device. With no other limitations, the element restricted by the phrase "include a . . . " does not exclude the existence of other same elements in the process, method, item or device including the elements.

The method and apparatus for deploying the edge server are described in detail. The principle and implementations of the disclosure are illustrated in conjunction with the embodiments, and the above description of the embodiments is only used to help understand the method and core idea of the disclosure. Those skilled in the art may make modifications to the specific embodiments and application range based on the essence of the disclosure. In conclusion, the content of the specification should not be interpreted as limitation on the disclosure.

The invention claimed is:

1. A method for deploying edge servers, comprising:
obtaining IP addresses of target users for the edge servers to be deployed;
mapping the IP addresses of the target users into a virtual geometric space;
clustering the target users based on coordinates of the target users in the virtual geometric space, to obtain a plurality of user groups; and
determining locations of the edge servers corresponding to the plurality of user groups based on the coordinates of the target users in the plurality of user groups, comprising:
determining that the virtual geometric space is a geographic location space, determining geographic locations of the target users based on the coordinates, and determining each of the locations of the edge servers to be a geographic location that has a largest frequency of occurrence among the geographic locations of the target users in a corresponding one of the plurality of user groups; or
determining that the virtual geometric space is a network space, determining network distances among the target users based on the coordinates, and determining each of the locations of the edge servers to be a geographic location that has a largest frequency of occurrence among geographic locations of the target users in a set of neighbor users of a corresponding one of the plurality of user groups, wherein the set of neighbor users corresponds to a central user of the corresponding one of the plurality of user groups, and comprises one or more users from which a network distance to the central user is less than a preset distance threshold.

2. The method according to claim 1, wherein the virtual geometric space is the geographic location space, and the mapping the IP addresses of the target users into the virtual geometric space comprises:

searching in a geographic location database for geographic location information corresponding to the IP addresses of the target users, wherein the geographic location database stores a correspondence relationship between the IP addresses and the geographic location information; and determining the geographic location information as the coordinates of the target users in the virtual geometric space.

3. The method according to claim 2, wherein the determining locations of the edge servers corresponding to the plurality of user groups based on the coordinates of the target users in the plurality of user groups comprises:

obtaining geographic location information of the target users in the plurality of user groups in the virtual geometric space; and determining the locations of the edge servers corresponding to the plurality of user groups based on the geographic location information of the target users.

4. The method according to claim 1, wherein the virtual geometric space is the network space, and the mapping the IP addresses of the target users into the virtual geometric space comprises:

mapping the IP addresses of the target users to virtual network coordinates through a network space construction algorithm GNP; and determining the virtual network coordinates as coordinates of the target users in the virtual geometric space.

5. The method according to claim 4, wherein the determining locations of the edge servers corresponding to the plurality of user groups based on the coordinates of the target users in the plurality of user groups comprises:

determining central users in the plurality of user groups, and sets of neighbor users corresponding to the central users;

determining geographic locations of neighbor users in the sets of neighbor users;

determining geographic locations with maximum numbers of occurrences in the sets of neighbor users as geographic locations of corresponding central users; and judging whether the geographic locations of the central users are suitable for deploying the edge servers based on a preset deploying judgment principle, and in case of positive judgment, determining geographic locations suitable for deploying the edge servers as candidate locations for the edge servers of corresponding user groups.

6. The method according to claim 4, wherein the clustering the target users based on coordinates of the target users in the virtual geometric space to obtain the plurality of user groups comprises:

clustering the target users, based on a consistency of a network distance with an actual distance and based on a principle of farthest user priority, wherein the network distance is a distance in the virtual geometric space between the target users, to obtain the plurality of user groups;

wherein the consistency of the network distance with the actual distance is defined as: if the network distance between arbitrary two target users is larger than the network distance between another two target users, the actual distance between the arbitrary two target users is larger than the actual distance between the another two target users, and wherein the principle of farthest user priority is defined as: in any of the user groups, a maximum network distance between arbitrary two target users is less than a preset distance threshold.

7. The method according to claim 1, further comprising:

determining a capacity of each of the edge servers through a prebuilt uniform Integer Linear Programming ILP model.

8. An apparatus for deploying edge servers, comprising:
a storage, and
a processor,
wherein the storage stores program commands, which allow the apparatus to perform the following operations when the program commands are executed by the processor:

obtaining IP addresses of target users for the edge servers to be deployed;

mapping the IP addresses of the target users into a virtual geometric space respectively;

clustering the target users based on coordinates of the target users in the virtual geometric space, to obtain a plurality of user groups; and determining locations of the edge servers corresponding to the plurality of user groups based on the coordinates of the target users in the plurality of user groups, comprising:

determining that the virtual geometric space is a geographic location space, determining geographic locations of the target users based on the coordinates, and determining each of the locations of the edge servers to be a geographic location that has a largest frequency of occurrence among the geographic locations of the target users in a corresponding one of the plurality of user groups; or determining that the virtual geometric space is a network space, determining network distances among the target users based on the coordinates, and determining each of the locations of the edge servers to be a geographic location that has a largest frequency of occurrence among geographic locations of the target users in a set of neighbor users of a corresponding one of the plurality of user groups, wherein the set of neighbor users corresponds to a central user of the corresponding one of the plurality of user groups, and comprises one or more users from which a network distance to the central user is less than a preset distance threshold.

9. The apparatus according to claim 8, wherein the virtual geometric space is the geographic location space, and the program commands when executed by the processor allow the apparatus to perform:

searching in a geographic location database for geographic location information corresponding to the IP addresses of the target users, wherein the geographic location database stores a correspondence relationship between the IP addresses and the geographic location information; and determining the geographic location information as the coordinates of the target users in the virtual geometric space.

10. The apparatus according to claim 9, wherein the program commands when executed by the processor allow the apparatus to perform:

obtaining geographic location information of the target users in the plurality of user groups in the virtual geometric space; and determining the locations of the edge servers corresponding to the plurality of user groups based on the geographic location information of the target users.

11. The apparatus according to claim 8, wherein the apparatus is a personal computer, a server computer, a handheld or portable device, a tablet device or a multiprocessor device.

12. The apparatus according to claim 8, wherein the virtual geometric space is the network space, and the program commands when executed by the processor allow the apparatus to perform:
   mapping the IP addresses of the target users to virtual network coordinates through a network space construction algorithm GNP; and
   determining the virtual network coordinates as coordinates of the target users in the virtual geometric space.

13. The apparatus according to claim 12, wherein the processor allow the apparatus to perform:
   determining central users in the plurality of user groups, and sets of neighbor users corresponding to the central users;
   determining geographic locations of neighbor users in the sets of neighbor users;
   determining geographic locations with maximum numbers of occurrences in the sets of neighbor users as geographic locations of corresponding central users; and
   judging whether the geographic locations of the central users are suitable for deploying the edge servers based on a preset deploying judgment principle, and in case of positive judgment, determining geographic locations suitable for deploying the edge servers as candidate locations for the edge servers of corresponding user groups.

14. The apparatus according to claim 12, wherein the processor allow the apparatus to perform:
   clustering the target users, based on a consistency of a network distance with an actual distance and based on a principle of farthest user priority, wherein the network distance is a distance in the virtual geometric space between the target users, to obtain the plurality of user groups;
   wherein the consistency of the network distance with the actual distance is defined as: if the network distance between arbitrary two target users is larger than the network distance between another two target users, the actual distance between the arbitrary two target users is larger than the actual distance between the another two target users, and wherein the principle of farthest user priority is defined as: in any of the user groups, a maximum network distance between arbitrary two target users is less than a preset distance threshold.

15. The apparatus according to claim 12, wherein the processor allow the apparatus to further perform:
   determining a capacity of each of the edge servers through a prebuilt uniform Integer Linear Programming ILP model.

16. A computer readable, non-transitory, storage medium, comprising program commands which when executed by a processor allow the processor to perform:
   obtaining IP addresses of target users for the edge servers to be deployed;
   mapping the IP addresses of the target users into a virtual geometric space;
   clustering the target users based on coordinates of the target users in the virtual geometric space, to obtain a plurality of user groups; and
   determining locations of the edge servers corresponding to the plurality of user groups based on the coordinates of the target users in the plurality of user groups, comprising:
   determining that the virtual geometric space is a geographic location space, determining geographic locations of the target users based on the coordinates, and determining each of the locations of the edge servers to be a geographic location that has a largest frequency of occurrence among the geographic locations of the target users in a corresponding one of the plurality of user groups; or
   determining that the virtual geometric space is a network space, determining network distances among the target users based on the coordinates, and determining each of the locations of the edge servers to be a geographic location that has a largest frequency of occurrence among geographic locations of the target users in a set of neighbor users of a corresponding one of the plurality of user groups, wherein the set of neighbor users corresponds to a central user of the corresponding one of the plurality of user groups, and comprises one or more users from which a network distance to the central user is less than a preset distance threshold.

* * * * *